(12) United States Patent
Karam et al.

(10) Patent No.: US 8,009,577 B2
(45) Date of Patent: Aug. 30, 2011

(54) AUTOMATIC DATA RATE AND POWER ADJUSTMENT ON COMMUNICATIONS UPLINK BASED ON COMMUNICATIONS ACTIVITY ON COMMUNICATIONS DOWNLINK

(75) Inventors: Roger Karam, Mountain View, CA (US); Karl Nakamura, Palo Alto, CA (US); Palaniappan Karuppan, Cupertino, CA (US); Shriram Velaga, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 509 days.

(21) Appl. No.: 11/732,045

(22) Filed: Apr. 2, 2007

(65) Prior Publication Data
US 2008/0239978 A1 Oct. 2, 2008

(51) Int. Cl.
*H04J 1/16* (2006.01)
(52) U.S. Cl. .................... 370/252; 370/318
(58) Field of Classification Search .......... 370/464, 370/465, 468, 241, 248, 252, 310, 311, 276, 370/277, 278, 315, 316, 317, 318, 229, 230, 370/232; 455/7, 11.1, 12.1, 13.4
See application file for complete search history.

(56) References Cited

U.S. PATENT DOCUMENTS

| | | | | | |
|---|---|---|---|---|---|
| 5,991,281 | A | * | 11/1999 | Hiramatsu | 370/331 |
| 6,798,751 | B1 | * | 9/2004 | Voit et al. | 370/252 |
| 2003/0063569 | A1 | | 4/2003 | Kalliokulju et al. | |
| 2003/0221026 | A1 | * | 11/2003 | Newman | 710/8 |
| 2004/0146072 | A1 | * | 7/2004 | Farmwald | 370/537 |
| 2004/0160898 | A1 | | 8/2004 | Lim et al. | |
| 2005/0100120 | A1 | | 5/2005 | Barton et al. | |
| 2005/0107107 | A1 | * | 5/2005 | Shahidi et al. | 455/522 |
| 2005/0181811 | A1 | * | 8/2005 | Magnusson et al. | 455/458 |
| 2006/0067222 | A1 | | 3/2006 | Endoh | |
| 2006/0224402 | A1 | * | 10/2006 | Hanna et al. | 705/1 |
| 2007/0025264 | A1 | | 2/2007 | Cheng et al. | |
| 2008/0049660 | A1 | * | 2/2008 | Kwan et al. | 370/318 |
| 2008/0075054 | A1 | * | 3/2008 | Balasubramanian et al. | 370/338 |
| 2008/0107091 | A1 | * | 5/2008 | Ramachandran | 370/338 |
| 2008/0219289 | A1 | * | 9/2008 | Harrison et al. | 370/465 |

OTHER PUBLICATIONS

Marvel Solutions, 88E1181 Datasheet, Integrated 10/100/1000 Gigabit Ethernet Transceiver, Doc. No. MV-S101866-00, Rev. A, pp. 1-8 and pp. 51-55. Aug. 3, 2005.

* cited by examiner

*Primary Examiner* — Kwang B Yao
*Assistant Examiner* — Obaidul Huq
(74) *Attorney, Agent, or Firm* — BainwoodHuang

(57) ABSTRACT

An Internet Protocol (IP) telephone operates a communications uplink to a switch based on activity on a separate communications downlink (such as to a personal computer) to conserve power when possible. The IP telephone monitors the communications activity of a link partner on the communications downlink, and when the link partner is present and operating at a relatively high data rate, the IP telephone operates the communications uplink at a correspondingly high data rate to support the communications needs of the IP telephone and the link partner. If the monitoring indicates that the link partner has reduced communications activity (which may include becoming entirely disconnected from the communications downlink), the IP telephone transitions to a second operating condition to operate the communications uplink at a relatively low data rate, with a corresponding decrease in the power required for operation of the communications uplink interface circuitry. By this mechanism, the power required to operate the IP telephony system can be reduced to realize costs savings etc.

24 Claims, 3 Drawing Sheets

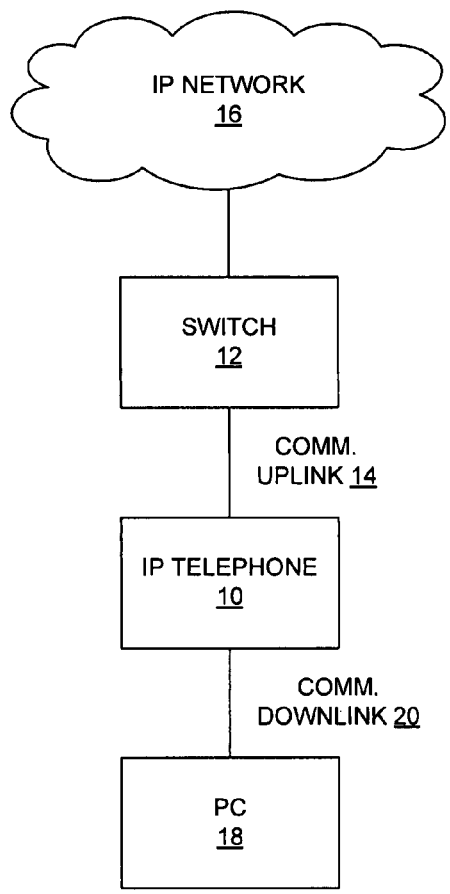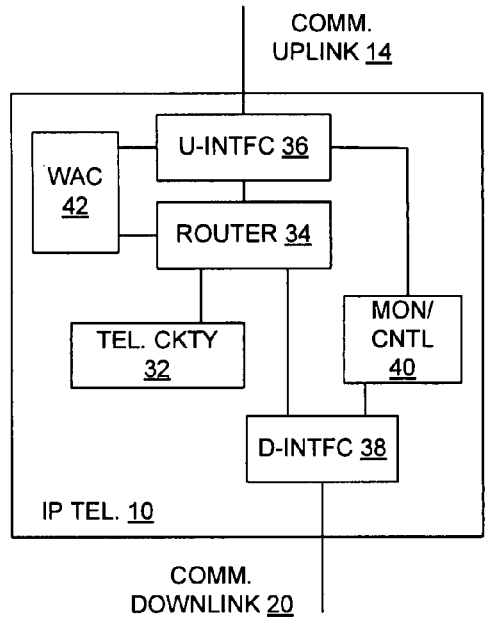
Fig. 1
Fig. 3

AUTOMATIC DATA RATE AND POWER ADJUSTMENT ON COMMUNICATIONS UPLINK BASED ON COMMUNICATIONS ACTIVITY ON COMMUNICATIONS DOWNLINK

BACKGROUND

Current deployments of Internet Protocol (IP) telephony utilize a configuration in which an IP telephone has a connection to a central switch as well as to a local device such as a personal computer (PC). The IP telephone includes a small switch/router that routes both IP telephone communications as well as data communications to/from the PC over the communications link to the switch, such that only one physical connection may be required between the switch and each individual user work area (e.g. office), while still providing for transfer of PC data networking traffic as well as IP telephony traffic to/from a network to which the switch is connected. Also current networking equipment has little control for managing speed and bandwidth to reduce power.

BRIEF DESCRIPTION OF THE DRAWINGS

Objects, features and advantages of the presently disclosed methods and apparatus will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 1 is a block diagram of a communications path between a network and individual user equipment including an Internet Protocol (IP) telephone and personal computer (PC);

FIG. 3 is a block diagram of the IP telephone of FIG. 1; and

DETAILED DESCRIPTION

Overview

Figure 2:
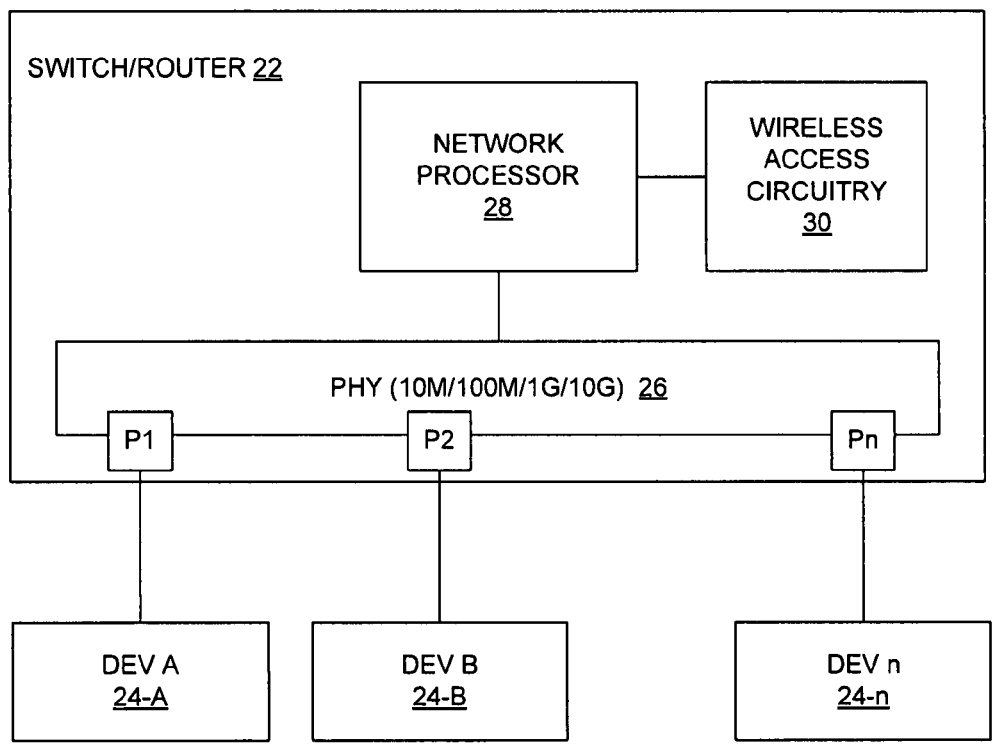
FIG. 2 is a block diagram of a switch or router that may be used in a communications system such as shown in FIG. 1.

As presently disclosed, an Internet Protocol (IP) telephone or similar network device operates to provide a necessary data communications rate on a communications uplink to a switch or similar device while also taking steps to conserve power when possible by reducing the data rate at which the communications uplink operates. Specifically, the network device monitors the communications activity of a link partner on a separate communications downlink that couples the network device to the link partner and that forms part of an overall communications path between the switch and the link partner. When the link partner is present and operating in the usual fashion (at a relatively high data rate), the network device operates the communications uplink at a correspondingly high data rate in order to adequately support the communications needs of both the network device and the link partner. If the monitoring during this first operating condition indicates that the link partner has a reduced communications activity (which may include becoming entirely disconnected from the communications downlink), the network device transitions to a second operating condition in which it operates the communications uplink at a relatively low data rate, with a corresponding decrease in the power required for operation of the communications uplink interface circuitry. When the communications activity of the link partner increases again, the network device can transition back to higher-speed operation of the communications uplink. By this mechanism, the power required to operate the system can be reduced in order to realize costs savings etc.

Description of Example Embodiments

FIG. 1 illustrates a commercial IP telephone installation. An Internet Protocol (IP) telephone 10 is coupled to a switch 12 via a communications uplink 14. The switch 12 in turn is connected to an IP network 16. The IP telephone 10 is also coupled to a local data terminal device, such as a personal computer (PC) 18, via a communications downlink 20. Although not shown in FIG. 1, a typical installation includes a plurality of IP telephones 10 with respective connections to the switch 12, with some or all of the IP telephones 10 having respective connections to local PCs 18. As described in more detail below, the IP telephone 10 serves as part of the communications path for data transfer between the PC 18 and the switch 12, in addition to serving as a telephone for a local human user. The configuration of FIG. 1 is well suited, for example, to a typical office environment in which individual users require both telephone services as well as data networking services (for server and/or Internet access, for example). Each user's PC can share the single communications uplink 14 with the user's IP telephone 10, conserving physical and logical resources while achieving the desired connectivity.

FIG. 2 illustrates a switch or router 22 that may be employed in a system such as the system of FIG. 1. It may serve as the switch 12, for example, or as described in more detail below it may even be a switch/router within the IP telephone 10. The switch/router 22 supports packet transfer among a number "n" devices 24-A, 24-B, . . . , 24-n. It includes a physical layer 26 which consists of one or more PHY ICs and interface circuitry that collectively provide physical-layer ports P1, P2, . . . , Pn. A network processor 28 is capable of creating a network interface and has supporting software. Wireless interfaces may exist on such a device via wireless access circuitry 30 supporting wireless communication similar to 802.11 or equivalent. The attached devices 24-A, 24 -B, . . . , 24-n can be any of a variety of Ethernet devices such as a personal computer (PC), an IP telephone, a personal digital assistant (PDA), a wireless access point, a video camera, etc.

Power savings at the physical layers are possible through negotiations among the devices 24 (via the switch/router 22 or other channel(s)) in real time to change speed on two or more links, in order to reduce power consumption. Such negotiations may use one or more protocols based on a policy implemented in the switch/router 22, in the devices 24, or both, depending on what the operating systems of both the switch/router 22 and the devices 24 agree on. These protocols may include a timing routine setup to enable an administrator of the switch/router 22 and/or devices 24 to scale power back. They may also include a live/real time exchange of such requests via a protocol such as Cisco Discovery Protocol (CDP) or similar packet based protocols based on activity packet counts and/or application bandwidth-requirements for the devices. Another protocol may be physical-layer based, where a local PHY circuit detects the presence or absence of a device as described below, of course manual power reduction can be achieved by both sides of the link when a user based request is initiated.

FIG. 3 illustrates the configuration of the IP telephone 10. Local telephone functions such as voice coding/decoding, call initiation and receiving, user interface etc., are represented by telephony circuitry (TEL CKTY) 32. The telephony circuitry 32 is coupled to the communications uplink 14 via a router 34 and uplink interface circuitry (U-INTFC) 36. The communications downlink 20 has a separate interface to the router 34 via downlink interface circuitry (D-INTFC) 38. Monitoring and control circuitry (MON/CNTL) 40 is responsible for certain operational monitoring and control functions as described in more detail below. The IP telephone 10 may also include wireless access circuitry (WAC) 42.

In a common configuration, both the communications uplink 14 and communications downlink 20 utilize standard unshielded twisted pair (UTP) wiring and Ethernet physical-layer (PHY) signaling technology, such as 10 Mb Ethernet (10 MbE) or 100 Mb Ethernet (100 MbE). More recently, PCs have begun utilizing 1 Gb Ethernet (GbE) network communications interfaces, and thus it has been necessary to deploy IP telephones 10 with interface circuitry 36 and 38 capable of running 1 GbE in order to properly support such local PCs. In the future, physical-layer signaling technology such as 10 GbE may be deployed in configurations such as shown in FIG. 1.

One of the issues that arises, however, is the relatively high power consumption of the uplink interface circuitry 36 when operating at 1 GbE. GbE signaling utilizes four UTP pairs driven by both endpoint devices (e.g., at the IP telephone 10 and switch 12 for the communications uplink 14). The power consumption for GbE signaling can easily amount to 0.5-1.0 watt per endpoint. In a large installation having numerous phone/PC connections of the type shown in FIG. 1, the amount of power required just to perform GbE signaling can be considerable. However, some (potentially significant) amount of that power may be wasted in some circumstances. In particular, at various times (such as nights and weekends) the PC 18 may be inactive and thus not generating data communications traffic, and in such cases it is not necessary for communications uplink 14 to be operated at such a high data rate as 1 GbE for example. Although it is normally necessary to maintain communications between the switch 12 and the IP telephone 10 for both incoming as well as outgoing calls, a lower data rate such as that of 10 MbE or 100 MbE is sufficient for such purposes. The extra power required to operate the communications uplink 14 at 1 GbE is wasted under such circumstances. It would be good to avoid such unnecessary high-speed and high-power operation in order to conserve energy and reduce overall operating costs of an IP telephony installation.

Figure 4:
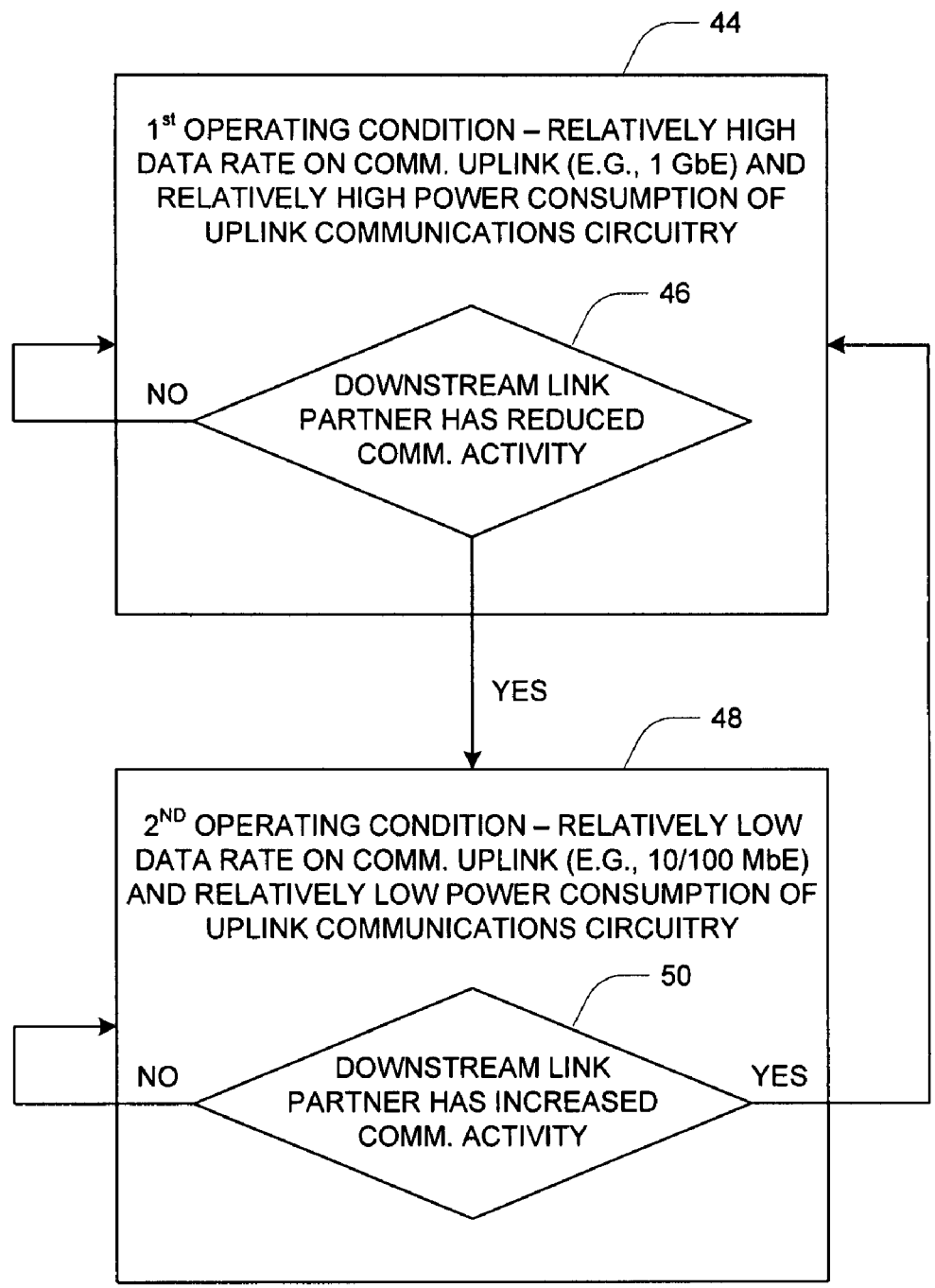
FIG. 4 is flow diagram depicting operation of the IP telephone of FIG. 3.

FIG. 4 illustrates an overall method by which the IP telephone 10 monitors and controls its operation to achieve better use of power while retaining high-performance operation when required. The operations of FIG. 4 are performed by the monitoring/control circuitry 40 of FIG. 3 in conjunction with the interface circuitry 36 and 38. FIG. 4 refers to the communications activity of a "link partner" on the communications downlink 20, which in the embodiment of FIG. 1 is the PC 18. It will be appreciated that in alternative embodiments other types of link partners may be coupled to the IP telephone 10 via the communications downlink 20, such as a personal digital assistant (PDA) or other type of data terminal device.

Block 44 represents a first operating condition during which a relatively high data rate is utilized on the communications uplink 14, along with a corresponding relatively high power consumption of the uplink interface circuitry 36. For example, the communication uplink may be run at 1 GbE in order to support 1 GbE operation of the communications downlink 20. As shown at 46, during this operating condition the monitoring and control circuitry 40 monitors the communications activity of the link partner on the communications downlink 20. If the communications activity is not reduced (i.e., remains at the relatively high rate) as indicated by the NO branch, operation continues in the first operating condition 44. Upon detecting that the communications activity is reduced as indicated by the YES branch, a second operating condition 48 is entered that involves a lower power consumption. The reduction in communications activity at 46 may be detected in any of a variety of ways, as described below.

In the second operating condition 48, a relatively low data rate is utilized on the communications uplink 14, along with a corresponding relatively low power consumption of the uplink interface circuitry 36. For example, the communication uplink may be run at 100 MbE or 10 MbE in order to support the communications needs of the telephony circuitry 32 and the reduced communications activity of the downstream link partner connected to the communications downlink 20. The power consumption of the uplink interface circuitry 36 is correspondingly reduced. The current power consumption for a single 1 GbE interface is about 0.5 watts, while that number is about 0.125 watts for a 100 MbE interface. Thus, when the speed is changed to 100 MbE, the continuous power savings approaches 0.75 watts for a two-partner link. Saving can become substantial when this technique is implemented in organizations that have hundreds or thousands of users.

As shown at 50, during the second operating condition 48 the monitoring and control circuitry 40 monitors the communications activity of the link partner on the communications downlink 20. If the communications activity is not increased (i.e., remains at the relatively low rate, which may include zero) as indicated by the NO branch, operation continues in the second operating condition 48. Upon detecting that the communications activity is increased as indicated by the YES branch, a transition back to the first operating condition 44 is made. In this way, the monitoring and control circuitry 40 ensures that adequate communications capacity is available for the communications path between the switch 12 and PC 18 when required.

The detection steps 46 and 50 can be realized in any of a variety of ways. In one class of embodiments, the monitoring and control circuitry 40 may monitor to determine whether the link partner is present or absent (with presence corresponding to the increased communications activity and absence corresponding to the decreased communications activity). Presence/absence detection can be performed, for example, by detecting the presence of link pulses or other electrical signals indicating the presence of the link partner, or by using time-domain reflectometry (TDR) available on PHY ICs or similar techniques that can detect whether a physical transmission line is terminated at the other end. Even if the link partner is present, however, it may still be relatively inactive, and variation of the communications activity of the link partner can be detected using other means. For example, the monitoring/control circuitry 40 may employ packet counting over predefined intervals, which may be on the order of minutes for example. Alternatively, there may be some type of explicit signaling used to identify the actual or expected communications activity level of the link partner. This signaling could be in the form of a user-operated control on the IP telephone 10, for example, or a signaling message from a network administrator or other authorized remote user which may arrive via one of the links 14, 20 or via a separate out-of-band link (not shown). The detection mechanism may be configured to automatically take into account periods of expected low activity, such as nights, weekends or holidays.

Another important component of a detection mechanism is the operating software of the device attached to an Ethernet switch. For example, if a device 24-A is connected to an n-port switch/router 22 as shown in FIG. 2, the operating software of such a device 24 is aware of user activity and can configure the system and its communications links to optimize the experience of the user. Thus, if a user of device 24-A is constantly exchanging video or has other high bandwidth requirements for example, the device 24-A may notify the switch/router 22 of a need for a higher speed, whereas if the user is mostly doing word processing then the device 24-A may notify the switch/router 22 of a need for lower speed. Generally, a device 24 may initiate a request to change speed up or down as the need for bandwidth changes. Software in the attached devices (such as Windows, Linux, MAC OS and their associated applications or the like) needs to be aware of such functionality. The switch/router 22 may single out more than one device 24 to initiate a speed shift request, because the switch/router 22 has the ability to know where packets are headed to among its ports Pn assuming the ports are all on a local LAN. There can thus be a multiplication of power savings across one or more physical layers. Special protocols at the Physical or higher levels may be used to enhance the power negotiations both in real time, before link in established, or after link has gone down to optimize power consumption.

Generally, when a link partner is added to an Ethernet link such as communications uplink 14, a process called "auto-negotiation" is automatically performed which establishes the data rate and duplex configuration of the link. In the transition back to the first operating condition 44 in the process of FIG. 4, it is possible to simply permit standard auto-negotiation to be performed to arrive at the higher operating data rate (e.g., the uplink interface circuitry 36 and switch 12 may automatically settle upon 1 GbE operation). Alternatively, it may be desirable to bypass auto-negotiation if possible, on the assumption that the characteristics of the communications uplink 14 are known and relatively static, and thus auto-negotiation is not necessary for the operating transitions illustrated in FIG. 4. In this case the uplink interface circuitry 36 may be configured, either independently or under control of the monitoring and control circuitry 40, to simply begin operating at the previously established higher data rate for the communications uplink (e.g., 1 GbE), and of course the switch 12 is configured likewise. This operation may reduce delays that might be experienced waiting for auto-negotiation to occur.

It will be appreciated that standard auto-negotiation may not be usable to make the transition to the lower data rate of the second operating condition 48, because standard auto-negotiation automatically selects the highest data rate at which both ends (e.g. switch 12 and IP telephone 10) are capable of operating. It may be possible to utilize a modified form of auto-negotiation in which each endpoint can signal a "preferred" data rate that may be lower than the maximum data rate the endpoint is capable of. Using such a mechanism in the transition to the second operating condition 48, the uplink interface circuitry 36 may (under the control of the monitoring/control circuitry 40) provide an indication to the switch 12 during auto-negotiation that it prefers to run at 10 MbE or 100 MbE, for example, even though it also indicates that it is capable of running at 1 GbE. Such a modified auto-negotiation may utilize a known "next page" mechanism to convey the non-standard signaling to the other end.

While the above description has been directed to an IP telephone 10 specifically, it will be appreciated that the presently disclosed technique may be utilized in other kinds of systems having similar operational considerations, specifically the ability to monitor communications activity on one or more communications ports of a network device and make adjustments to the data rate and power consumption at one or more other communications ports of the network device. For example, the disclosed technique may find use in so-called "wireless access points" that provide communications paths between a centralized switch and wireless devices that may be deployed in the area of the wireless access point. The wireless access point can monitor the communications activity of one or more wireless downlink ports for purposes of managing the data rate and power consumption of the uplink port(s) to the switch. For example, when the aggregate data rate of the wireless devices is above some predetermined threshold, the wireless access point may operate its uplink ports at relatively high data rate such as 1 GbE, but when the aggregate data rate is sufficiently low then it changes operation of the uplink port(s) to a relatively lower data rate such as 10 MbE or 100 MbE.

An example of such a wireless point may be the use of IEEE 802.11 compatible wireless access circuitry 42 inside an IP phone 10 as shown in FIG. 3. The presence or absence of a link partner may be determined by the strength of radio signals and the total power consumption of the wireless access point, reducing both its physical layer power consumption and its packet processing related power-consumption based on its communication activities and the need for packet transfer into and out of the IP phone 10 and the switch (e.g. 12) connected to the IP phone 10 as well as any wireless devices communicating with this access point. It is worth noting that the power savings in the configuration of FIG. 1 includes several components as follows: Savings in the physical-layer interface power consumption, on both sides of each communication link, wired or wireless. Note that a physical layer is the medium interface circuit known as the PHY in the art, shown in FIG. 3 as 36, 38 for wired interfaces and as 42 for wireless. Also note that the savings occur on both sides of the links 14 and 20, causing the total power savings to be four times the power savings of downshifting speed from 1 GbE to 100 MbE for example on a single PHY. Also note that onboard processor and supporting logic speeds may be able to downshift their clock speed and thus consume less power as the supporting routing and switching functions scale back their speed due to reduces activity and less throughput.

Although the above description is directed to Ethernet communications links and standard Ethernet signaling schemes (i.e., 1 GbE, 10/100 MbE, etc.), it will be appreciated that the technique can be applied to various types of physical-layer communications technologies and may employ non-standard signaling schemes if desired. As an example, if the communications downlink 20 is operating at 100 MbE, the communications uplink 14 may be operated using a non-standard signaling scheme that provides a sufficient data rate to support the needs of the telephony circuitry 32 and the downstream link partner, but consumes less power than standard 1 GbE or 100 MbE signaling. In such a case, of course, it is necessary for the switch 12 (or more generally the link partner on the communications uplink 14) to be capable of operating according to the non-standard signaling scheme.

Additionally, it may be desired to include a "environmental" switching condition. The operating temperature of the network device can be monitored, and if it rises above some predetermined threshold temperature then the data rate of one or more communications links is decreased, with corresponding decreases in the power consumed by the interface circuitry. This will have the effect of reducing the operating temperature below the threshold temperature.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a network device having a communications uplink to an upstream link partner and a communications downlink to a downstream link partner, the communications uplink and communications downlink forming part of a communications path between the upstream link partner and the downstream link partner, the method comprising:

in a first operating condition in which the communications uplink is configured as an Ethernet link operated at a first data rate and uplink communications circuitry in the network device is operated at a corresponding first power consumption, detecting that the downstream link partner has reduced communications activity on the communications path, in response to detecting that the downstream link partner has reduced communications activity on the communications path, performing a modified auto-negotiation with the upstream link partner via the Ethernet link to transition the communications uplink from the first data rate to a second data rate, the second data rate of the communications uplink being a slower rate relative to the first data rate of the communications uplink in the first operating condition, and in response to performing the modified auto-negotiation with the upstream link partner switching to a second operating condition in which the communications uplink is operated at the second data rate and the uplink communications circuitry is operated at a corresponding second power consumption, the second power consumption being lower than the first power consumption; and in the second operating condition, detecting that the downstream link partner has increased communications activity on the communications path and in response switching to the first operating condition.

2. A method according to claim 1 wherein detecting that the downstream link partner has reduced communications activity comprises detecting whether the downstream link partner is present on the communications downlink.

3. A method according to claim 2 wherein the communications downlink comprises an Ethernet communications link and wherein detecting whether the downstream link partner is present on the communications downlink comprises detecting the presence of Ethernet link pulses on the communications downlink.

4. A method according to claim 1 wherein detecting that the downstream link partner has reduced communications activity comprises monitoring a rate of packet transmission or reception by the downstream link partner on the communications downlink and comparing the rate of packet transmission or reception with a predetermined threshold value corresponding to a predetermined reduced communications activity.

5. A method according to claim 1 wherein detecting that the downstream link partner has reduced communications activity comprises receiving an explicit signaling message identifying an actual or expected communications activity level of the downstream link partner.

6. A method according to claim 1 wherein the downstream link partner is one of a plurality of downstream link partners, and wherein detecting that the downstream link partner has reduced communications activity comprises detecting that an aggregate communications activity of the downstream link partners is reduced.

7. A method according to claim 1 wherein:

the upstream link partner is one of a plurality of link partners coupled to corresponding communications links for which there is corresponding link communications circuitry;

in the first operating condition, the communications links are operated at respective relatively high data rates and the communications circuitry is operated at a corresponding relatively high power consumption; and in the second operating condition, the communications links are operated at respective relatively low data rates and the communications circuitry is operated at a corresponding relatively low power consumption.

8. The method of claim 1 wherein, in the first operating condition in which the communications uplink is operated at the relatively high data rate, the communications uplink is operated at least at 1 Gigabit Ethernet (1 GbE).

9. A network device, comprising:

uplink interface circuitry for coupling to a communications uplink to which an upstream link partner can be coupled;

downlink interface circuitry for coupling to a communications downlink to which a downstream link partner can be coupled, the communications uplink and communications downlink forming part of a communications path between the upstream link partner and the downstream link partner; and monitoring and control circuitry operative:

(1) in a first operating condition in which the communications uplink is configured as an Ethernet link operated at a first data rate and uplink interface circuitry in the IP telephone is operated at a corresponding first power consumption, to detect that the downstream link partner has reduced communications activity on the communications path, in response to detecting that the downstream link partner has reduced communications activity on the communications path, to perform a modified auto-negotiation with the upstream link partner via Ethernet link to transition the communications uplink from the first data rate to a second data rate, the second data rate of the communications uplink being a slower rate relative to the first data rate of the communications uplink in the first operating condition, and in response to performing the modified auto-negotiation with the upstream link partner to switch to a second operating condition in which the communications uplink is operated at the second data rate and the uplink interface circuitry is operated at a corresponding second power consumption, the second power consumption being lower than the first power consumption; and (2) in the second operating condition, to detect that the downstream link partner has increased communications activity on the communications path and in response to switch to the first operating condition.

10. A network device according to claim 9 further comprising:

telephony circuitry operative to provide Internet Protocol (IP) telephone functionality to a local user; and a router coupled to the telephony circuitry as well as to the uplink interface circuitry and downlink interface circuitry, the router being operative to carry data communications traffic between the upstream link partner and the telephony circuitry as well as between the upstream link partner and the downstream link partner.

11. A network device according to claim 9 wherein both the communications uplink and the communications downlink are Ethernet communications links.

12. A network device according to claim 9 wherein the communications downlink is a wireless communications downlink.

13. A network device according to claim 9 further comprising detecting the presence or absence of the downstream link partner based on the strength of radio signals and total power consumption of a wireless access point within the network device.

14. A network device according to claim 9 wherein the downstream link partner is one of a plurality of downstream link partners, and wherein detecting that the downstream link partner has reduced communications activity comprises detecting that an aggregate communications activity of the downstream link partners is reduced.

15. A network device according to claim 9 wherein:
the upstream link partner is one of a plurality of link partners coupled to corresponding communications links for which there is corresponding link communications circuitry;
in the first operating condition, the communications links are operated at respective relatively high data rates and the communications circuitry is operated at a corresponding relatively high power consumption; and
in the second operating condition, the communications links are operated at respective relatively low data rates and the communications circuitry is operated at a corresponding relatively low power consumption.

16. A network device according to claim 9 wherein the monitoring and control circuitry is further operative in the first operating condition to determine whether an operating temperature of the network device is above a threshold, and if so to switch to the second operating condition.

17. The network device of claim 9, wherein the uplink interface circuitry is configured as at least a 1 Gigabit Ethernet (1 GbE) network communication interface and wherein the communications uplink is configured to operate at least at 1 GbE.

18. A method of operating a system having a plurality of devices coupled to communications links, comprising:
detecting, by a wireless access point, a downstream link partner of the plurality of devices on the communications links having reduced communications activity relative to a first data rate in a first operating condition, the communications links being configured as Ethernet links operated at the first data rate;
performing, by a wireless access point, modified auto-negotiations with an upstream link partner in real time to change a data rate on a communications uplink from the first data rate to a second data rate, the second data rate being slower than the first data rate, in order to reduce power consumption;
in response to performing modified auto-negotiations, reducing, by the wireless access point, the data rate on the communications uplink from the first data rate to the second data rate in a second operating condition, the second data rate of the communications uplink being slower relative to the first data rate of the communications uplink;
in response to reducing the data rate, reducing, by the wireless access point, a power consumption of uplink communications circuitry of the wireless access point from a first power consumption level to a second power consumption level in the second operating condition, the second power consumption level being lower than the first power consumption level; and
detecting, by the wireless access point in the second operating condition, the downstream link partner of the plurality of devices on the communications links having increased communications activity on a communications link and in response switching to the first operating condition.

19. A method according to claim 18 wherein the modified auto-negotiations use one or more protocols based on a policy implemented in a switch or router to which the devices are coupled.

20. A method according to claim 18 wherein the modified auto-negotiations use one or more protocols based on a policy implemented in the devices.

21. A method according to claim 18 wherein the modified auto-negotiations include a real-time exchange of requests via a packet-based discovery protocol based on activity packet counts and/or application bandwidth requirements for the devices.

22. A method according to claim 18 wherein at least one of the devices is aware of user activity and is capable of communicating with either another of the devices or with a switch/router to which the devices are coupled to signal a need for a change of data rate based on the user activity.

23. A method according to claim 22 wherein the at least one device initiates a request to change data rate up or down based on the user activity, and wherein the switch/router identifies more than one device to initiate a request for change of data rate, the identification being based on knowledge within the switch/router of the destinations of packets among ports of the switch/router.

24. The method of claim 18, wherein performing the modified auto-negotiations among the devices in real time comprises performing, by the wireless access point, modified auto-negotiations among the devices in real time to allow the devices on the communications links to indicate the use of a data rate that is lower than a maximum data rate the devices are capable of using.

* * * * *